May 5, 1970  MASAHARU SUMIYOSHI ET AL  3,509,972

BAND BRAKE

Filed Nov. 12, 1968  2 Sheets-Sheet 1

INVENTORS
MASAHARU SUMIYOSHI AND
HIROYOSHI KAKO
BY
Harry G. Shapiro
ATTORNEY

United States Patent Office 3,509,972
Patented May 5, 1970

3,509,972
BAND BRAKE
Masaharu Sumiyoshi and Hiroyoshi Kako, Toyota-shi, Japan, assignors to Toyota Jidosha Kogyo Kabushiki Kaisha, Aichi-ken, Japan, a corporation of Japan
Filed Nov. 12, 1968, Ser. No. 774,657
Claims priority, application Japan, Jan. 20, 1968, 43/3,160
Int. Cl. F16d 53/00
U.S. Cl. 188—77                              1 Claim

ABSTRACT OF THE DISCLOSURE

The present invention provides a brake means comprising two brake bands, one of which being used for obtaining the initial brake power and the other being always used to increase the said initial brake power regardless of the rotational direction of the rotor by means principally of the combination of cam surface and balls or rollers.

---

This invention relates to an improvement of brake device for tightening a brake drum with a brake band, as is used for parking brake and emergency brake, and more in particular, this invention relates to the brake for increasing braking power more than the conventional brakes.

In the conventional brakes, the increase of the braking power depended wholly on the servo power, and therefore it is difficult to make the brakes light and small. Therefore, in an automobile, which has a restricted space, it is impossible to provide such a parking brake having satisfactory braking power, and the braking effect of the conventional parking brake is not satisfactory.

The object of this invention, in view of the drawbacks of the conventional brakes, is to provide the brake which is light and small, wherein the braking power thereof is increased by the servo effect of the brake band, and in addition by appropriately selecting the size of the cam groove and balls, the braking power can be optionally obtained.

In accordance with this invention, the brake bands are provided on the inner and outer peripheries of the brake drum and the inner brake band thereof comprises a means of balls and cam grooves so as to optionally increase the braking power in the manner of geometrical progression, and therefore it is possible to obtain considerably strong braking power can be obtained although the braking means is relatively light and small and at the same time the efficiency of brake is made more excellent, and the brake of this invention can be provided easily in such a place that is restricted in view of space, and the effect of the brake of this invention can be remarkably presented.

There has been proposed, for example, in the U.S. Pats. Nos. 3,204,727 and No. 2,953,220, means for raising the brake power obtained by the initial force by using cam surface and balls. In the U.S. Pat. No. 3,204,727, two brake discs, one of which being used for increasing the brake power, while the other disc being held stationary. On the other hand, in the U.S. Pat. No. 2,953,220, two brake shoe elements are provided, one of which elements being used depending on the left or right directional rotation of the rotor, and for this selection of the rotational direction, a primary brake shoe having cam surface and balls is utilized. And consequently, in this patent, the combination of cam surface and balls is an auxiliary means for obtaining sufficient enough brake power for actuating the principal brake power, so that the brake power can be obtained without using cam surface and balls.

In accordance with the present invention, however, two brake bands are provided, one of which being used for obtaining the initial brake power and the other being always used to increase the said initial brake power regardless of the rotational direction of the rotor. And further, the combination of cam surface and balls is the principal means for increasing the brake power.

The feature of this invention resides in the brake device comprising a housing, a rotary shaft supported rotatably on the housing, a cylindrical portion provided on said housing coaxially with the rotary shaft, a brake drum coaxially provided on the outer periphery of the cylindrical portion to be rotated as one body with said rotary shaft, a retainer which is provided between said brake drum and the cylindrical portion for supporting a plural number of balls or rollers, a first brake band which is made of elastic material provided between the retainer and said brake drum, and a part of the ring of which being cut, cam-grooves provided in correspondence with said balls or rollers on the outer periphery of said cylindrical portion, a second brake band provided on the outer periphery of said brake drum, a connecting body which is fixed on said retainer and is provided freely movably on said housing in correspondence with the cut portion of the second brake band, the means for connecting the connecting body and said second brake band, and the means for tightening the second brake band, whereby when said rotary shaft makes relative movement to the housing which supports the rotary shaft by tightening the second brake band, the relative movement can move the retainer to the cylindrical portion which is fixed on the housing and has the cam-grooves on the outer periphery thereof and can press-contact the first brake band to the internal surface of the brake drum in connection with the cam grooves and the balls or rollers.

Next, an embodiment of this invention is explained by taking as an example the center brake of an automobile in which the center brake is provided between the transmission case and extension housing. It is a present tendency that the number of automobiles in which disk brakes are adopted for both rear and front wheels, and the reason for this is that small center brake of light weight is required to be provided.

This invention will be described more clearly referring to the illustrative embodiment shown in the attached drawing, in which.

Figure 1:
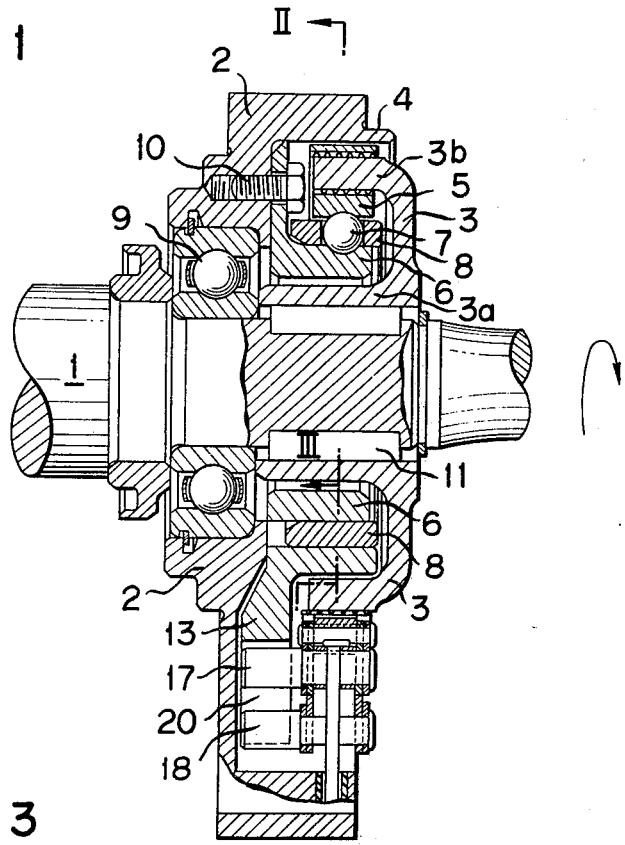
FIG. 1 is a vertical cross sectional view of an embodiment of the brake of this invention.
Figure 3:
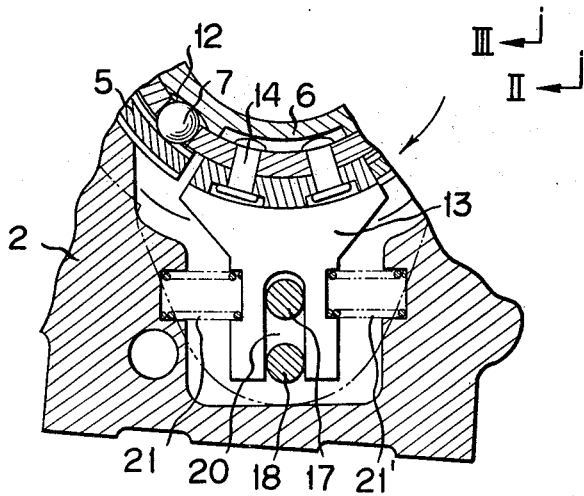
FIG. 3 is a cross-sectional view on line III—III of FIG. 1.
Figure 2:
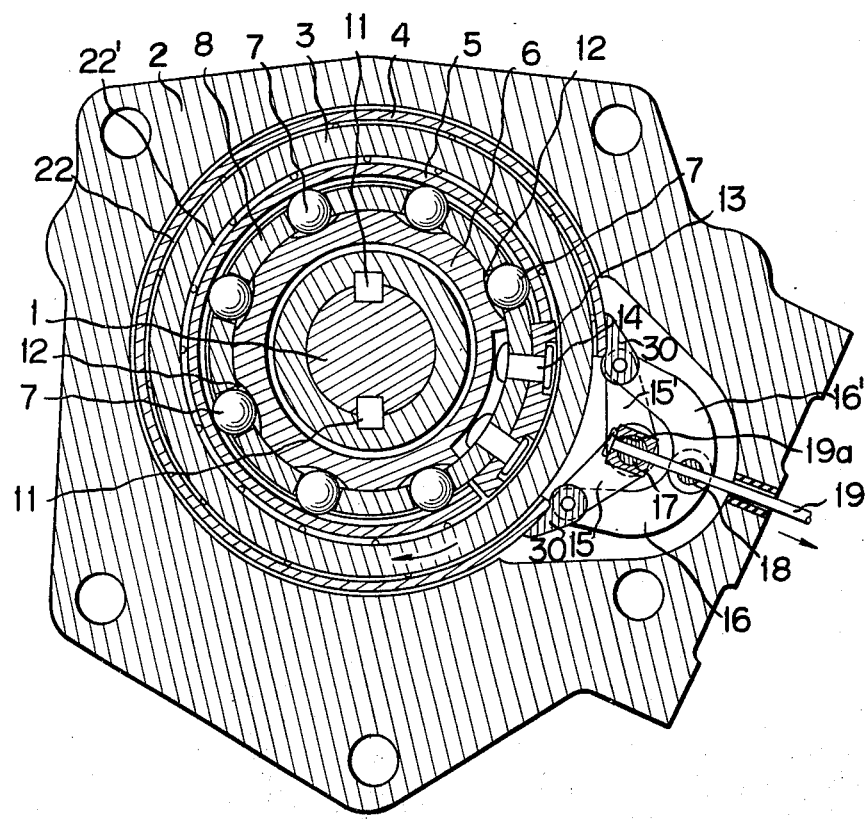
FIG. 2 is a cross-sectional view on line II—II of FIG. 1.

Referring to FIG. 1 and FIG. 2; 1 is an output rotary shaft from a transmission, 2 is a housing, 3 is a brake drum, 4 is an outer brake, 5 is an inner brake band, 6 is a cylindrical body, 7 show balls and 8 is a retainer. The output rotary shaft 1 is supported rotatably on the housing 2 through the bearing 9. In the housing 2, the cylindrical portion 6 is provided using bolt 10, and the outer surface of the cylindrical portion 6 is shaped coaxially with the axis of said rotary shaft 1. On the outer periphery of the cylindrical portion 6 the brake drum 3 is provided with an appropriate interval and said brake drum 3 is united by the base portion 3a thereof with the rotary shaft 1 by means of the key 11, and is rotated with the rotary shaft 1, and the inner and outer peripheral surfaces of the drum portion 3b are shaped coaxially with the axis of the rotary shaft 1. On the outer peripheral surface of the cylindrical portion 6, appropriate number of cam-grooves 12 are provided in circumferential direction, and on the inner periphery of the brake drum 3, inner brake band 5 of ring form is provided with an appropriate interval, and the balls 7 retained by the retainer 8 are inserted into the cam grooves 12 between the ring form inner brake band 5 and the cylindrical portion 6. The cut portion is provided on the inner brake band 5 of ring form, and the base portion of the connecting body 13 is present in the space of the cut portion of the inner brake band 5, and the base portion of the connecting body 13 is united to the retainer 8 by means of rivet 14. The outer brake band 4 is provided on the outer periphery of the brake drum 3, and the cut portion is provided on the outer brake band 4. The link supporting member 30 is provided on both end portions of the brake band 4, and each of two links 15, 15' and 16, 16' are pivoted on the link supporting member 30, respectively. The other ends of the link 15, 15' are connected by the link pin 17, and the other ends of the link 16, 16' are connected by the link pin 18, and the brake wire 19 is provided through the link pins 17 and 18, and the fitting portion 19a is provided on the end portion of the brake wire 19, and when the brake wire is pulled in the direction shown by an arrow as shown in FIG. 2, the outer brake band 4 is contracted by means of the links 15, 15'. The link pins 17, 18 are fitted to the U shaped groove 20 of the connecting body 13 united to the retainer 8 as are shown in FIG. 2 and FIG. 3, and by means of said connecting body 13, the outer brake band 4 and the retainer 8 are made into a single body in the direction of the rotation, and make the same rotation. On the left and right side portions of the connecting body 13 provided with U groove 20, the coil springs 21, 21' are present between the same and the housing 2, and the stopping positions of the outer brake band 4 and the retainer 8 are regulated thereby.

The outer brake band 4 and the inner brake band 5 are made of elastic materials such as spring steel, and the outer brake band 4 has the externally expanding spring force and the inner brake band 5 has the internally contractable spring force. It is possible if desired, to increase the frictional force of the brake by lining appropriate frictional materials 22, 22' such as sintered copper on the frictional surface of the outer and inner brake bands 4, 5 with the brake drum 3.

The embodiment of this invention has such a structure as explained above, and the functions of the embodiment are explained in the following. When the brake wire 19 is pulled, the outer brake band 4 is contracted by means of links 15, 15' and 16, 16' to generate the contact frictional force between the same and the outer peripheral surface of the brake drum 3, and the outer brake band 4 is rotated in the same direction as the brake drum 3. When the brake drum 3 is rotated in the direction shown by an arrow of FIG. 2, it is rotated in the right hand direction. The movement of the right hand rotation of the outer brake band 4 is transmitted to the retainer 8 as the movement of the right hand rotation against the spring force of the coil spring 21 through the links 15, 15' and 16, 16', the link pins 17 and 18, and the connecting body 13 as are shown in FIG. 1 and FIG. 3.

When the retainer 8 is rotated in the right hand direction, the retainer 8 pulls and rotates the balls 7 supported by said retainer 8, and therefore the respective balls 8, all together, go up the slant surface of the cam grooves 12 of the cylindrical body 6 provided on the housing 2 which is a fixed body. When the balls 7 go up the slant surface of the cam grooves 12, the balls 7 are radially moved outwardly in the radius direction, and therefore the balls 7 expand the inner brake band 5 on the outer periphery thereof, and the inner brake band 5 is frictionally contacted with the inner peripheral surface of the brake drum 3. Thus, first, the contact frictional force of the inner brake band 5 from inside the brake drum 3, and the contact frictional force of the outer brake band 4 from outside the brake drum 3 as mentioned above, work as the braking power on the brake drum 3.

Next, the inner brake band 5 is expanded by the balls 7 to be contacted with the inner peripheral surface of the brake drum 3 and to generate braking power, and in this position the braking power is not sufficient and when the brake drum 3 is rotated and moved in the right hand direction, the inner brake band 5 is also rotated and moved in the right hand direction along with the right hand rotation of the brake drum, and the end of the brake band 5 in the direction of the rotation is contacted with the base portion of the connecting body 13 united to the retainer 8 by means of the rivet 14, and the inner brake band 5 presses the connecting body 13 with the contact frictional force thereof with the brake drum 3 to further rotate and move the retainer 8 in the right hand direction. When the right hand rotation of the retainer 8 is further progressed, the balls 7 supported by the retainer 8 go further up the slant surface of the cam groove 12 and the balls 7 are further widened outwardly in the direction of radius to expand the inner brake band 5, and to further increase the contact frictional force between the inner brake band 5 and the inner periphery of the brake drum 3. Thus the braking power is increased as a whole.

The end of the inner brake band 5 in the operating direction presses the connecting body 13 with the increased frictional force to rotate the retainer 8 in the right hand direction and to further increase the braking power, and in accordance with this invention, the above mentioned operation is repeatedly carried out, and the force of inner brake band 5 for pushing the brake drum 3 from inside is increased in the manner of geometrical progression, and the value of force can be appropriately adjusted by suitably planning the cam grooves and the diameter of the balls, and therefore powerful braking force can be obtained.

In releasing brake, when the brake wire 19 is loosened, the rotation of the connection body 13 can be reduced, and the connecting body 13 can be turned back to the original position by the spring force of the coil spring 21.

An embodiment of this invention has been explained so far by taking an example of the center brake of the parking brake of an automobile, but this invention can be used as the generally used foot brake and at the same time it can be used as the third brake (emergency brake) which is required to be provided in view of safety.

What is claimed is:

1. A brake device comprising a housing; a rotary shaft supported rotatably on the housing; a cylindrical portion provided on said housing coaxially with the rotary shaft; a brake drum coaxially provided on the outer periphery of the cylindrical portion to be rotated as one body with said rotary shaft; a retainer provided between said brake drum and the cylindrical portion for supporting a plural number of balls or rollers; a first brake band made of elastic material provided between the retainer and said brake drum, said band being of ring shape and including a cut portion; cam grooves provided in correspondence with said balls or rollers on the outer periphery of said cylindrical portion, a second brake band, including a cut portion, provided on the outer periphery of said brake drum; a connecting body fixed on said retainer and provided with free movement on said housing in correspondence with the cut portion of the second brake band, means for connecting the connecting body and the said second brake band; and means for tightening the second brake band, whereby tightening of the second brake band on the outer periphery of the drum causes movement of said retainer relative to the cylindrical portion to thereby press-contact the first brake band to the internal surface of the brake drum in relation with the cam grooves and the balls or rollers.

References Cited

UNITED STATES PATENTS

| Re. 16,459 | 11/1926 | Auger | 188—77 |
| 1,380,565 | 6/1921 | Keys | 188—77 |
| 2,175,290 | 10/1939 | Gustafson | 188—77 X |

GEORGE E. A. HALVOSA, Primary Examiner

192—72, 80

U.S. Cl. X.R.